(12) United States Patent
Torrubia et al.

(10) Patent No.: US 8,516,447 B2
(45) Date of Patent: Aug. 20, 2013

(54) COMPUTER-IMPLEMENTED METHOD AND SYSTEM FOR BINDING DIGITAL RIGHTS MANAGEMENT EXECUTABLE CODE TO A SOFTWARE APPLICATION

(75) Inventors: Andres M. Torrubia, Alicante (ES); Miguel A. Roman, Alicante (ES); Ivan Gadea, Alicante (ES); Pau Sanchez, Alicante (ES)

(73) Assignee: Flexera Software LLC, Schaumburg, IL (US)

( * ) Notice: Subject to any disclaimer, the term of this patent is extended or adjusted under 35 U.S.C. 154(b) by 515 days.

(21) Appl. No.: 11/598,318

(22) Filed: Nov. 13, 2006

(65) Prior Publication Data

US 2007/0256064 A1    Nov. 1, 2007

(30) Foreign Application Priority Data

Apr. 26, 2006    (EP) .................................... 06380096

(51) Int. Cl.
*G06F 9/44* (2006.01)
*G06F 7/04* (2006.01)

(52) U.S. Cl.
USPC ................. 717/127; 717/121; 726/7; 726/17; 726/21

(58) Field of Classification Search
USPC ............................... 717/120–135; 726/1–33
See application file for complete search history.

(56) References Cited

U.S. PATENT DOCUMENTS

| | | |
|---|---|---|
| 5,339,430 A | 8/1994 | Lundin et al. |
| 5,375,241 A | 12/1994 | Walsh |
| 5,530,752 A | 6/1996 | Rubin |
| 6,006,328 A | 12/1999 | Drake |
| 6,029,259 A | 2/2000 | Sollish et al. |
| 6,104,679 A | 8/2000 | Sollish |
| 6,141,698 A * | 10/2000 | Krishnan et al. ............... 719/331 |
| 6,199,152 B1 | 3/2001 | Kelly et al. |
| 6,397,379 B1 | 5/2002 | Yates et al. |
| 6,425,098 B1 | 7/2002 | Sinquin et al. |
| 6,535,469 B1 | 3/2003 | Heylen |
| 6,560,176 B1 | 5/2003 | Heylen |
| 6,591,415 B1 | 7/2003 | Torribia-Saez et al. |
| 6,683,546 B1 * | 1/2004 | Torrubia-Saez ................ 341/51 |
| 6,748,079 B1 | 6/2004 | Downing |
| 6,802,006 B1 | 10/2004 | Bodrov |

(Continued)

FOREIGN PATENT DOCUMENTS

| | | |
|---|---|---|
| WO | WO-99/01815 | 1/1999 |
| WO | WO-0067095 A1 | 11/2000 |
| WO | WO-2005020068 | 3/2005 |

OTHER PUBLICATIONS

Liu et al., "Digital Rights Management for Content Distribution," Jan. 2003, Australian Computer Society, Inc.*

(Continued)

*Primary Examiner* — Qing Chen

(74) *Attorney, Agent, or Firm* — Michael A. Glenn; Perkins Coie LLP

(57) ABSTRACT

A computer-implemented method and system for binding digital rights management executable code to a software application are disclosed. The method and system include identifying a host code block in the host code section, copying the host code block from the host code section to a stub code block in the stub code section, and re-routing at least one reference of the host code block to be a reference of the stub code block.

20 Claims, 10 Drawing Sheets

(56) References Cited

U.S. PATENT DOCUMENTS

| | | | |
|---|---|---|---|
| 6,928,040 B2 | 8/2005 | Christensen | |
| 6,952,479 B2 | 10/2005 | Shavit et al. | |
| 6,966,002 B1 * | 11/2005 | Torrubia-Saez | 726/29 |
| 6,981,262 B1 * | 12/2005 | DeMello et al. | 719/310 |
| 7,137,105 B2 * | 11/2006 | Madsen et al. | 717/128 |
| 7,287,166 B1 | 10/2007 | Chang et al. | |
| 7,325,126 B2 | 1/2008 | Ivanov et al. | |
| 7,360,097 B2 * | 4/2008 | Rothstein | 713/189 |
| 7,360,252 B1 * | 4/2008 | Torrubia-Saez | 726/27 |
| 7,676,846 B2 * | 3/2010 | Robert et al. | 726/27 |
| 2003/0204374 A1 * | 10/2003 | Madsen et al. | 702/186 |
| 2004/0039926 A1 | 2/2004 | Lambert | |
| 2005/0004873 A1 | 1/2005 | Pou et al. | |
| 2005/0071653 A1 | 3/2005 | de Jong | |
| 2005/0198510 A1 * | 9/2005 | Robert et al. | 713/175 |
| 2006/0256105 A1 | 11/2006 | Scarlata et al. | |
| 2007/0094737 A1 * | 4/2007 | Larsson et al. | 726/26 |

OTHER PUBLICATIONS

Fetscherin et al., "Comparing the Usage of Digital Rights Management Systems in the Music, Film, and Print Industry," Sep. 2003, ACM, p. 316-325.*

Messerges et al., "Digital Rights Management in a 3G Mobile Phone and Beyond," Oct. 2003, ACM, p. 27-38.*

Safavi-Naini et al., "Import/Export in Digital Rights Management," Oct. 2004, ACM, p. 99-110.*

Koenen et al., "The Long March to Interoperable Digital Rights Management," Jun. 2004, IEEE, pp. 883-897.*

"Search Report for European Application No. EP06380096", (Feb. 9, 2006).

Cohen, F., "Operating System Protection Through Program Evolution", IFIP TC '11, Computers and Security, vol. 12, No. 6, Oct. 1993, pp. 565-584.

* cited by examiner

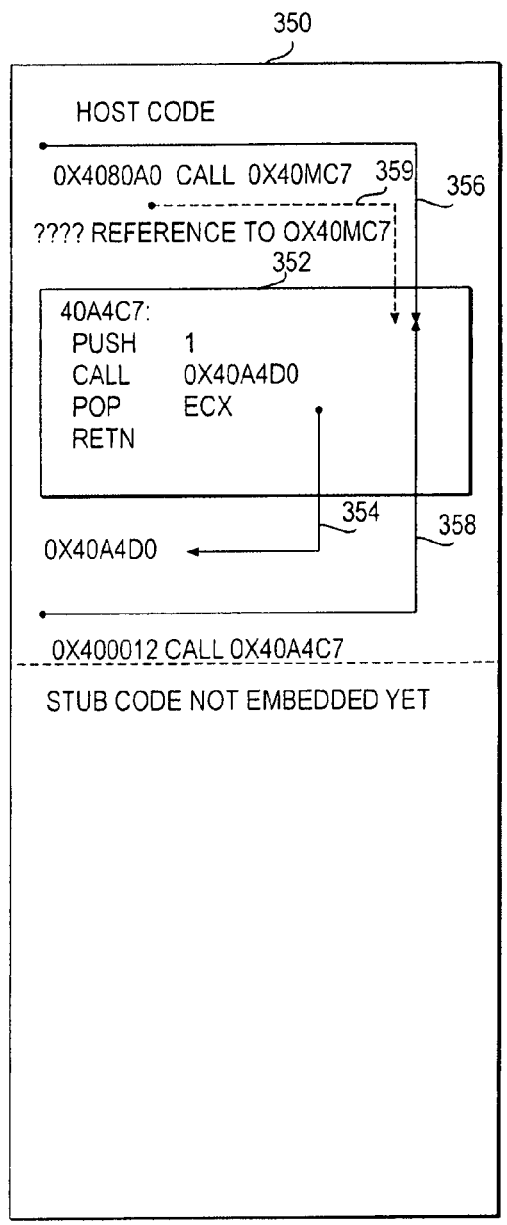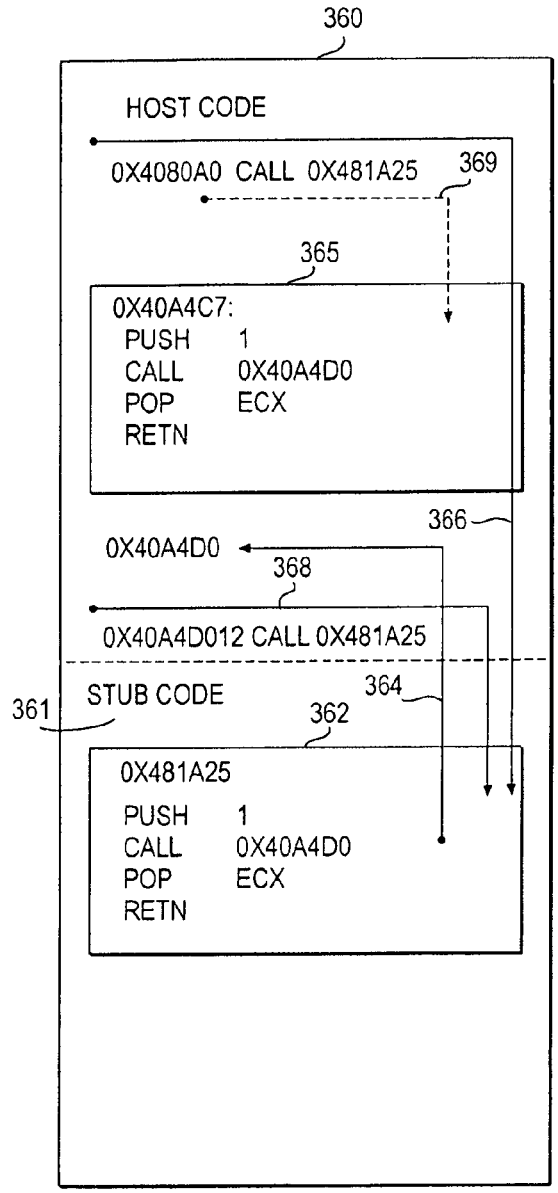
FIG. 3A
FIG. 3B

COMPUTER-IMPLEMENTED METHOD AND SYSTEM FOR BINDING DIGITAL RIGHTS MANAGEMENT EXECUTABLE CODE TO A SOFTWARE APPLICATION

BACKGROUND

1. Technical Field

This disclosure relates to digital rights management methods and systems. More particularly, the present disclosure relates to binding digital rights management executable code to a software application.

2. Related Art

The advent of digital distribution has created new business models for the delivery of software over the internet. One of the most widely used techniques to provide protection against illegal distribution and piracy of software is called wrapping.

Wrapping consists of adding a security and verification layer or a digital rights management layer (wrapper code) on top of an unprotected executable (host software or wrapped code henceforward) that typically verifies its associated business rules. Business rules typically include verification that the protected software has been purchased or, in the case of try and buy offerings, verification that the software is still within the trial period. Other types of digital rights management technologies can similarly be used. The most obvious benefit of performing wrapping at the executable level (vs. implementing security at the source-code level) is that the software developer does not need to worry about security when designing or implementing his or her software as wrapping does not require any source-code modifications. This results in a faster time to market.

The wrapper code (stub henceforward) verifies that a set of conditions are met when the protected executable first starts and then allows it to run normally if everything is as expected. For example, in a try-before-you-buy scenario, the wrapping code might first check the current date. If the current date is greater than the trial period's end, the software will display an expiration screen. Conversely, if the software is allowed to run, the wrapped code will be unencrypted and executed. At the moment when the host software is unencrypted, the software is vulnerable.

One of the most common attacks against wrapped software is to regenerate the original executable from the wrapped (or protected) executable. Because the original, non-secured executable contains no protection logic, it is relatively easy to dump the host software from memory and then distribute the unprotected host code throughout the Internet and Peer-to-Peer networks. This attack technique is possible because in conventional wrapping, the original wrapped executable can be easily separated from the wrapper code.

Thus, a computer-implemented method and system for binding digital rights management executable code to a software application are needed.

BRIEF DESCRIPTION OF THE DRAWINGS

Embodiments illustrated by way of example and not limitation in the figures of the accompanying drawings, in which:

FIGS. 3A and 3B illustrate an embodiment of the improved wrapping process where the host code block is retained.

DETAILED DESCRIPTION

A computer-implemented method and system for binding digital rights management executable code to a software application are disclosed. In the following description, numerous specific details are set forth. However, it is understood that embodiments may be practiced without these specific details. In other instances, well-known processes, structures and techniques have not been shown in detail in order not to obscure the clarity of this description.

Various embodiments include a mechanism to bind digital rights management executable code to an application (host software) without requiring code changes to the application. Some of the application blocks are copied to the code section where the digital rights management code resides, making removal of the digital rights management code more difficult to automate. As used herein, a code section (e.g. a host code section or a stub code section) simply refers to a contiguous block of code and does not mean to imply the use of particular data or code structures provided or defined by a particular software or operating system developer.

Various embodiments strive to improve the binding between the host executable and the stub code while maintaining the benefit of not requiring modifications of the host at the source-code level.

Figure 1:
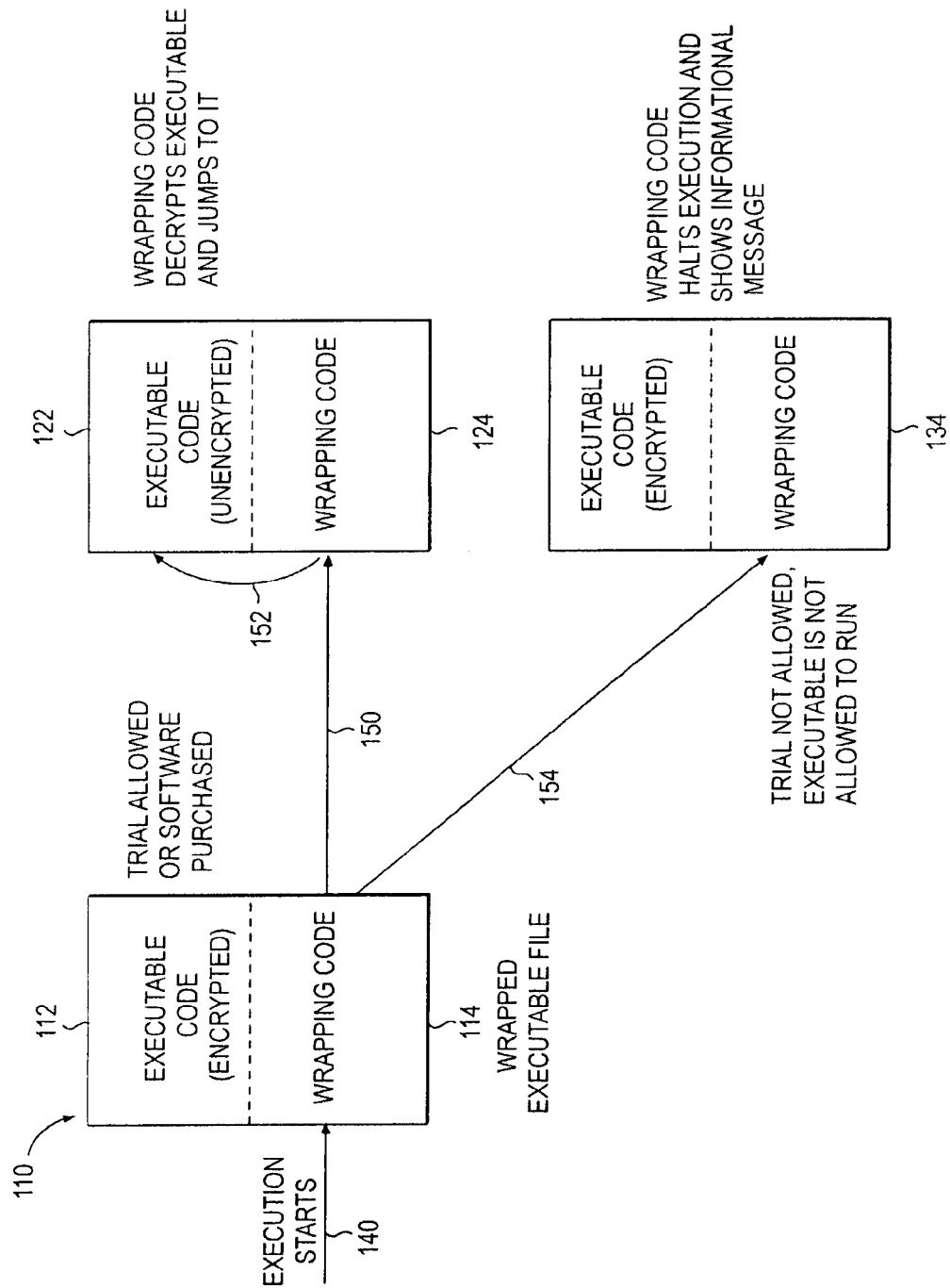
FIG. 1 depicts the usual flow for wrapped software.

FIG. 1 depicts the usual flow for wrapped software. Block 110 represents a software component, including an encrypted executable code portion 112 and a wrapping code portion 114. Executable code 112 can be host application software typically developed by a third party software developer and/or distributor. Wrapping code 114 comprises security or validation software, or software for enforcing digital rights management policies in relation to executable code 112. Software component 110 is typically made available for purchase or license by end-users through various distribution means such as network downloads or software available on computer readable media. Once an end-user obtains software component 110, the user can activate the software using conventional means. Upon activation, execution of a software component 110 begins at a location within wrapping code 114 as shown by arrow 140 in FIG. 1. Wrapping code 114 can execute various business rules and/or digital rights management rules, such as try-before-you-buy policies. For example, based upon a particular set of rules and associated conditions, wrapping code 114 may determine that a particular user may be allowed to access and use executable code 112 as purchased software or trial software. In this case, path 150 is taken as shown in FIG. 1 to a different portion of wrapping code 124. The different portion of wrapping code 124 decrypts executable code 112 to produce unencrypted executable code 122. Wrapping code 124 then jumps to the unencrypted executable code 122 as shown by path 152 and the user is then able to use host application software 122. Conversely, if wrapping code 114 determines that the user is not allowed to access executable code 112, path 154 is taken to another portion of wrapping code 134, where wrapping code 134 halts execution and shows the user an informational message indicating that access to executable code 112 is not allowed. In this manner, conventional wrappers can be used to protect a related executable code component.

Various embodiments improve conventional wrapping by more tightly binding the wrapping code (stub) to the wrapped executable code (host code) to be protected. In one embodiment, the improved wrapping process consists of identifying blocks within the host code that can be moved across the boundary between the executable code and the wrapper. This process involves picking a block of code from the stub whose size is equal or less than the host block, copying the host block to the memory section of the stub, adjusting inbound and outbound memory references to and from the host block to other blocks or locations within the host, copying the stub block to the memory section of the host, and adjusting inbound and outbound memory references to and from the host block to other blocks or locations within the stub.

The identification of host blocks can be done using conventional code disassemblers as well known to those of ordinary skill in the art. There are commercial programs such as IDA Pro ("IDA Pro Executive Summary," Manufactured by Hex-Rays SA of Belgium) that provide tools for the disassembling of executable code for multiple processors. These conventional code disassembly techniques can be automated using various methods.

Figure 2A:
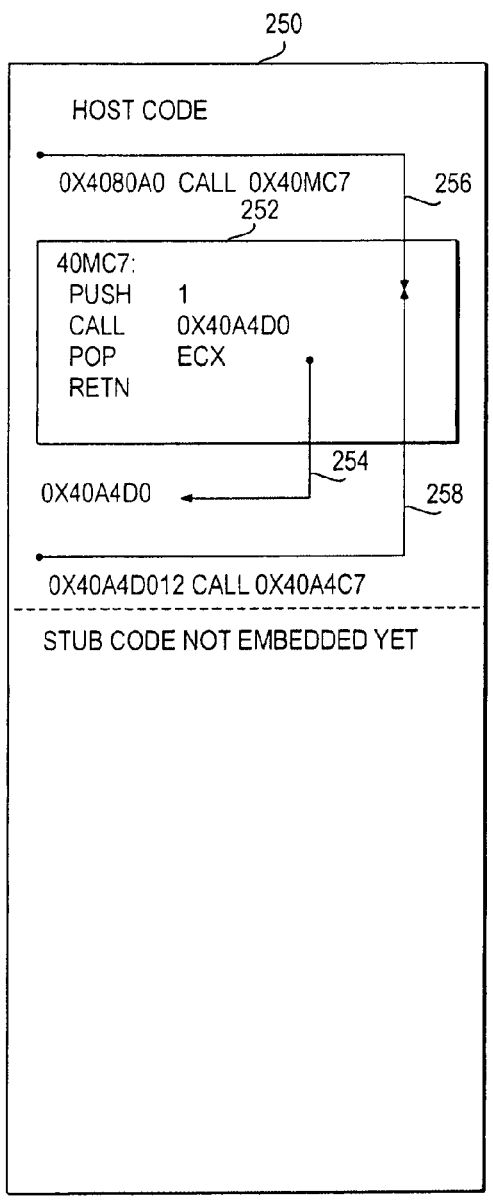
FIGS. 2A and 2B illustrate an embodiment of the improved wrapping process.
Figure 2B:
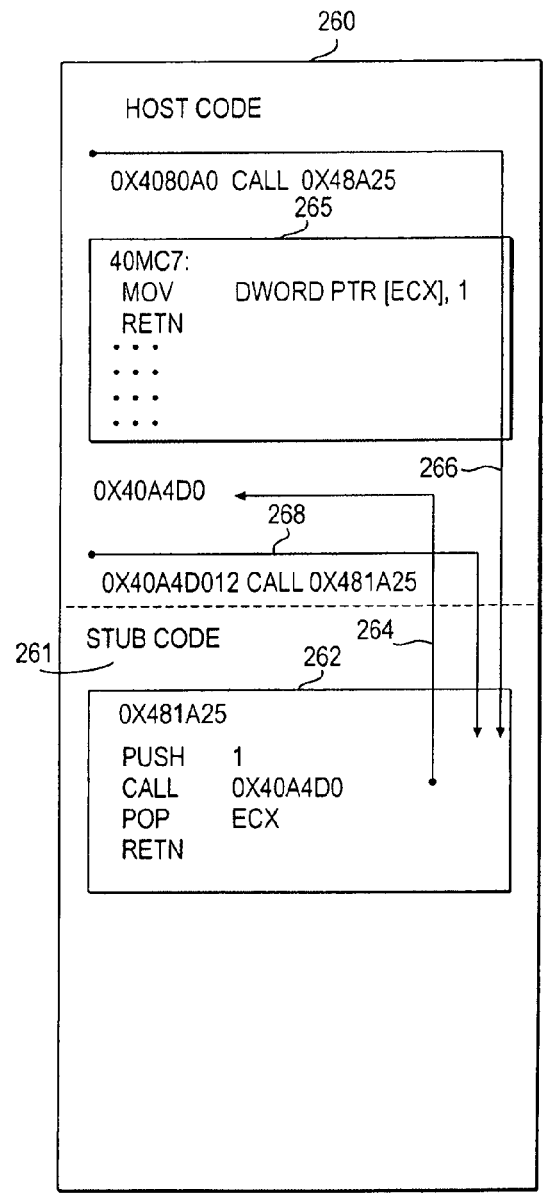

FIG. 2A illustrates an example of one host executable 250 in which a host block 252 has been identified at offset 0x40A4C7. Block 252 of the host code contains one outbound reference 254 (a call to location 0x40A4D0) and two inbound references 256 and 258 (from locations 0x4080A0 and 0x40D012, respectively). FIG. 2B shows the final executable 260 produced as a result of various embodiments. In executable 260, host block 252 has been moved to the stub code section 261 at location 262 and the inbound and outbound references have been corrected accordingly. In particular, outbound reference 254 has been re-routed as outbound reference 264. Inbound reference 256 has been re-routed as inbound reference 266. Inbound reference 258 has been re-routed as inbound reference 268. The host code block at location 265 (same location as block 252) has been overwritten with random instructions.

Figure 6:
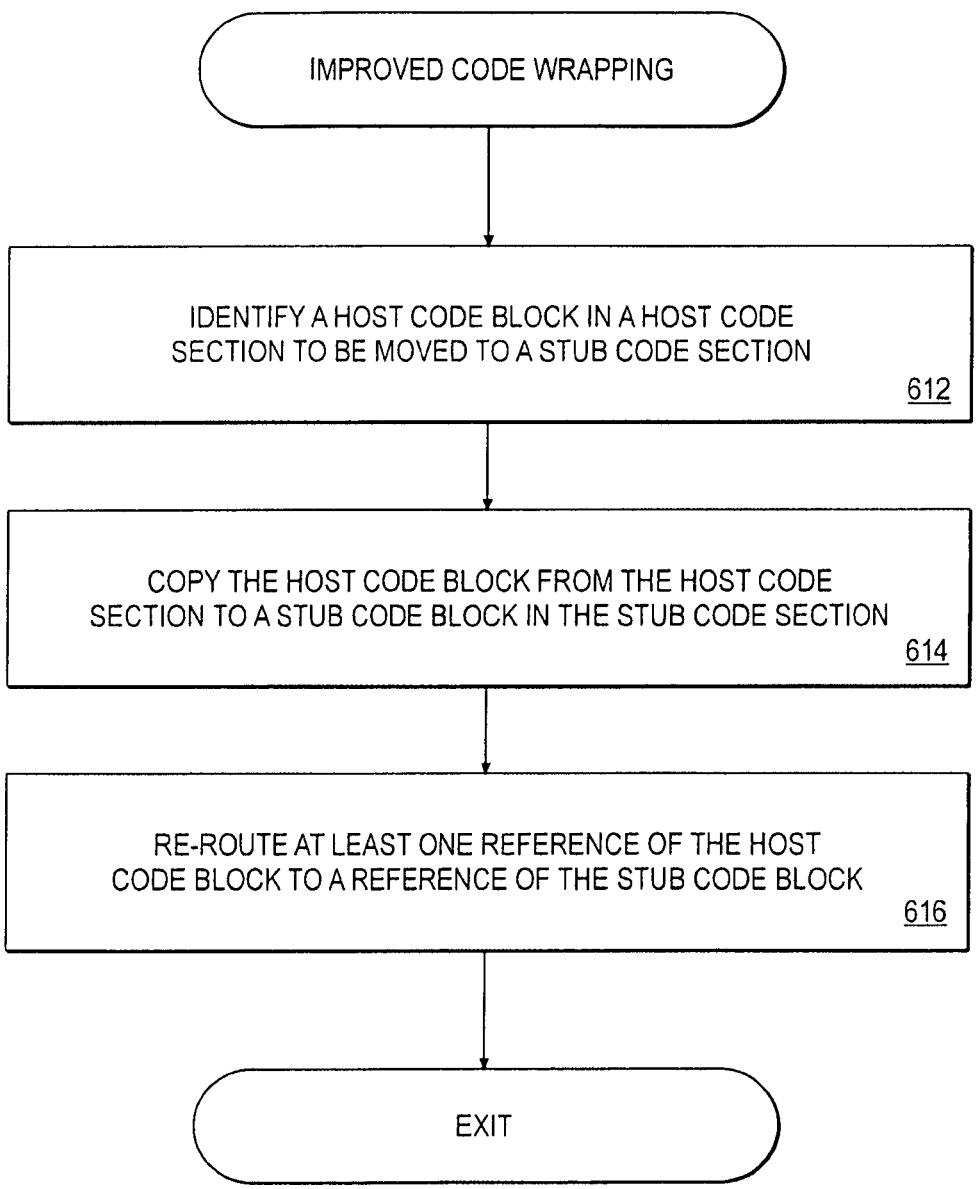
FIGS. 6-9 are flow diagrams illustrating the processing steps in various embodiments.

Referring to FIG. 6, a flow diagram illustrates the processing steps performed in one embodiment. At processing block 612, a host code block in the host code section is identified. At processing block 614, a copy of the host code block is written to a stub code block in the stub code section. At processing block 616, at least one reference of the host code block is re-routed to be a reference of the stub code block. In various embodiments, outbound and inbound references are corrected in the manner described above.

In some circumstances not all of the inbound references to host blocks can be reliably determined. The following embodiment deals with this circumstance. In another embodiment, the improved wrapping process consists of identifying blocks within the host code that can be moved across the boundary between the executable code and the wrapper. This process involves copying the host block to the memory section of the stub and adjusting inbound and outbound memory references to and from the host block to other blocks or locations within the host.

FIG. 3A illustrates an example of one host executable 350 in which a host block 352 has been identified at offset 0x40A4C7. Block 352 the host code contains one outbound reference 354 (a call to location 0x40A4D0) and two inbound references 356 and 358 (at locations 0x4080A0 and 0x40D012, respectively). In addition, there is an unknown reference 359 to location 0x40A4C7 depicted with a dashed line. FIG. 3B shows the final executable 360 produced as a result of various embodiments. In executable 360, a copy of host block 352 has been moved to the stub code section 361 at location 362 and the inbound and outbound references have been corrected accordingly. In particular, outbound reference 354 has been re-routed as outbound reference 364. Inbound reference 356 has been re-routed as inbound reference 366. Inbound reference 358 has been re-routed as inbound reference 368. Additionally, the original copy of the host block 352 has been left in the original location 365 within the host code, so the unknown reference 369 to location 0x40A4C7 continues to render consistent results as the reference 359 in the original copy of the host block 352 that remains at location 0x40A4C7.

Figure 7:
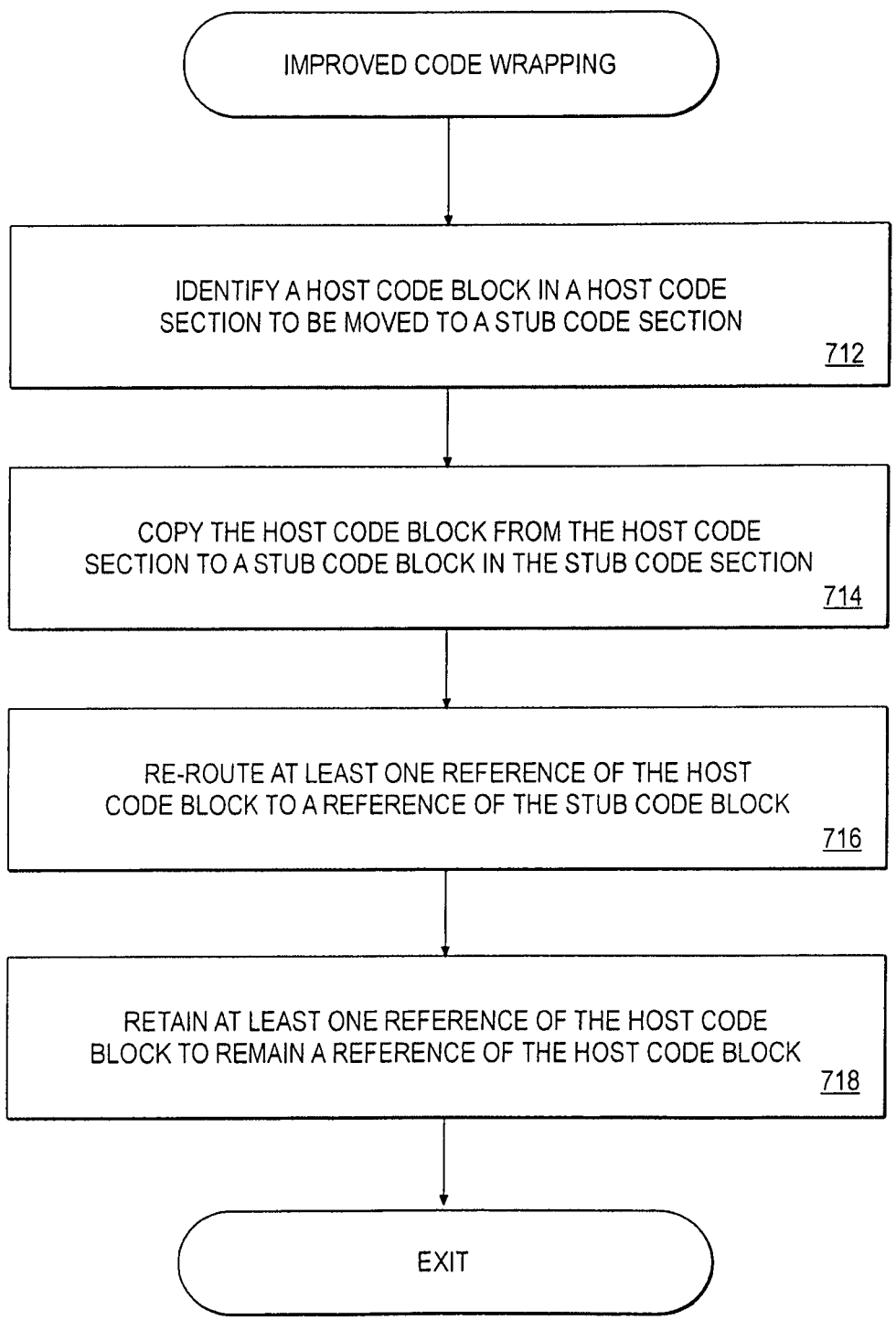

Referring to FIG. 7, a flow diagram illustrates the processing steps performed in one embodiment. At processing block 712, a host code block in the host code section is identified. At processing block 714, a copy of the host code block is written to a stub code block in the stub code section. At processing block 716, at least one reference of the host code block is re-routed to be a reference of the stub code block. In various embodiments, outbound and inbound references are corrected in the manner described above. At processing block 718, at least one reference of the host code block is retained to remain a reference of the host code block.

To further improve the binding between the host code and the stub code, another embodiment consists of identifying blocks within the host code that can be moved across the boundary between the executable code and the wrapper. This process involves, copying an identified host block to the memory section of the stub, adjusting outbound memory references from the host block to other blocks or locations within the host, and pointing the inbound blocks to a stub routine that performs security checks, such as CRC verifications, debugger detections, optical disc signature verifications (e.g. U.S. Pat. Nos. 6,535,469; 6,748,079; 6,560,176; 6,928,040; 6,425,098; 6,952,479; 6,029,259; and 6,104,679), checking the authenticity of a BIOS in a console system, checking the presence of a mod-chip in a console system, and other tamper-proofing verifications known to those of ordinary skill in the art.

Figure 4A:
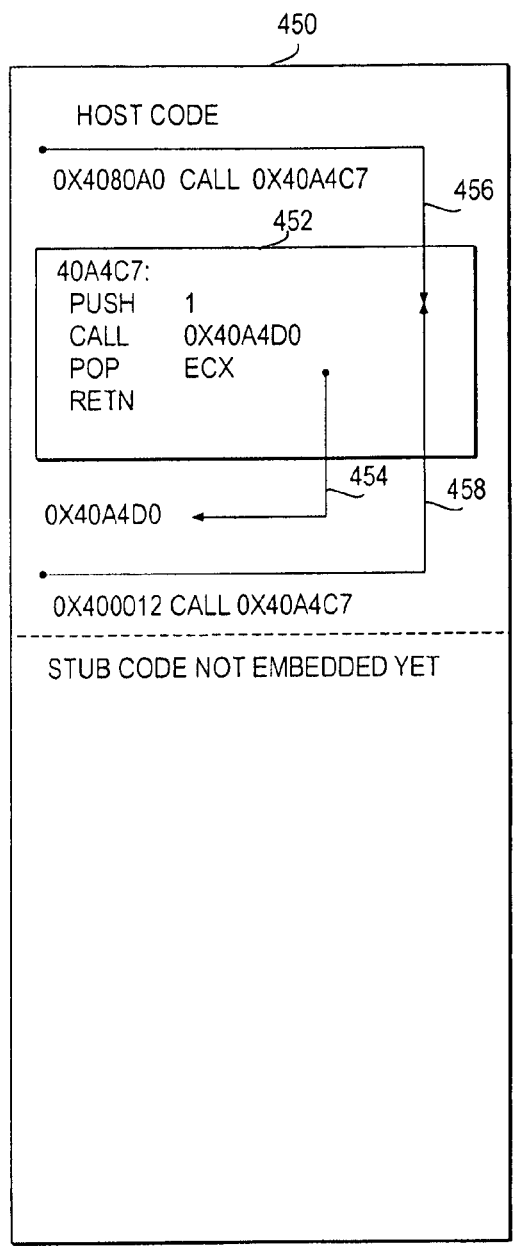
FIGS. 4A and 4B illustrate an embodiment of the improved wrapping process where a security block is provided.
Figure 4B:
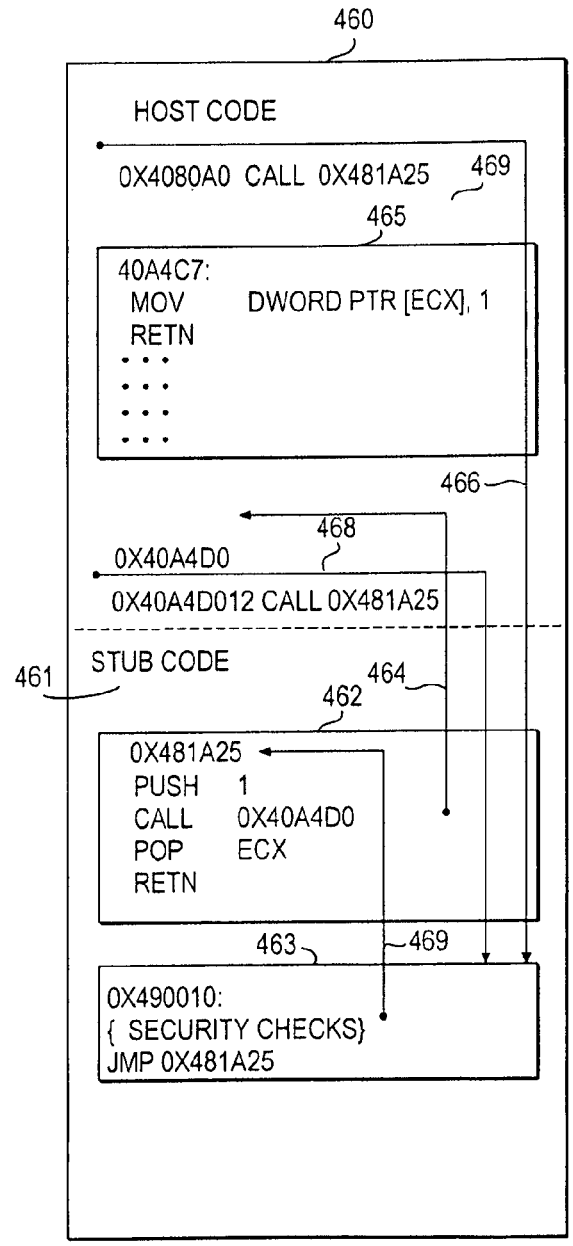

FIG. 4A illustrates an example of one host executable 450 in which a host block 452 has been identified at offset 0x40A4C7. Block 452 of the host code contains one outbound reference 454 (a call to location 0x40A4D0) and two inbound references 456 and 458 (at locations 0x4080A0 and 0x40D012, respectively). FIG. 4B shows the final executable 460 produced as a result of various embodiments. In executable 460, host block 452 has been moved to the stub code section 461 at location 462 and outbound references have been corrected accordingly. In particular, outbound reference 454 has been re-routed as outbound reference 464. The inbound references 456 and 458 to host block 452 have been re-routed to a stub routine 463 contained within the stub code section 461 and located at offset 0x490010 as shown in FIG. 4B as location 463. The host code block at location 465 (same location as block 452) has been overwritten with random instructions. As described above, stub routine 463 can be any of a variety of security, authorization, verification, digital rights management, access control, and/or tamper-proofing routines that can be executed prior to or after enabling access to the host code. Inbound reference 456 has been re-routed to stub routine 463 as inbound reference 466. Inbound reference 458 has been re-routed to stub routine 463 as inbound reference 468. When stub routine 463 has completed execution, processing control is transferred back from stub routine 463 to the copy of host block 462 at location 0x481A25 on path 469. At this point, the stub code section 461 has completed a desired level of security and/or access checking by virtue of the execution of stub routine 463.

Figure 8:
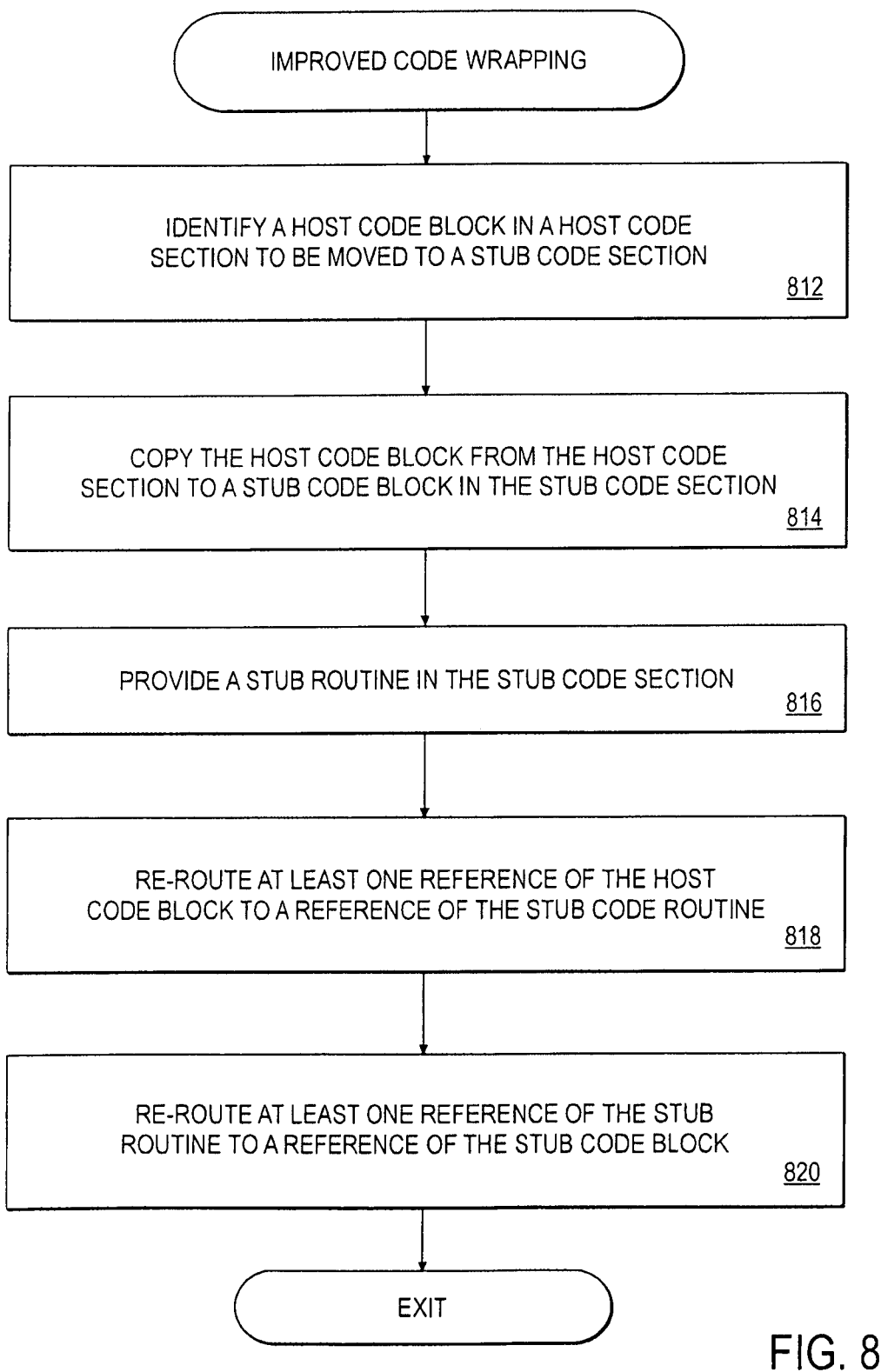

Referring to FIG. 8, a flow diagram illustrates the processing steps performed in one embodiment. At processing block 812, a host code block in the host code section is identified. At processing block 814, a copy of the host code block is written to a stub code block in the stub code section. At processing block 816, a stub routine is provided in the stub code section. As described above, the stub routine can be any of the security, authorization, verification, digital rights management, access control, and/or tamper-proofing routines described above. At processing block 818, at least one reference of the host code block is re-routed to be a reference of the stub routine. At processing block 820, at least one reference of the stub routine is re-routed to be a reference of the stub code block. In various embodiments, outbound and inbound references are corrected in the manner described above.

One potential attack that an attacker could use to determine if a given function in the stub code section is actually a function copied from the host code would be to find all memory references from the host to the stub section and determine if the corresponding memory in the stub section can be found in the host code. If this copy of the host code is found in the stub code, the attacker could replace the pointer to the stub code with the location of the corresponding pointer in the host code. This would effectively sever the wrapper code from the host code. To hamper this attack, another embodiment transforms the host function that is copied from the host code to the stub code by transforming the code to a functionally equivalent but not readily discernable form. One embodiment of code transformation is obfuscating the host function code at the assembly language level. For example, U.S. Pat. No. 6,591,415 describes how to obfuscate functions at the assembly code level. It will be apparent to those of ordinary skill in the art that other forms of code transformation could similarly be used.

Figure 5A:
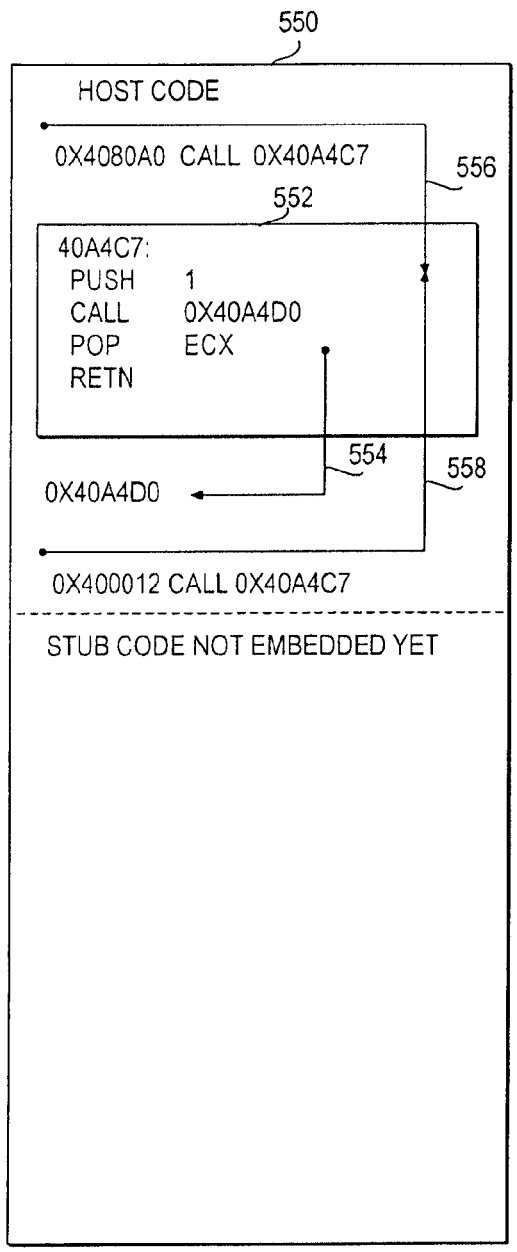
FIGS. 5A and 5B illustrate an embodiment of the improved wrapping process where the stub code is transformed.
Figure 5B:
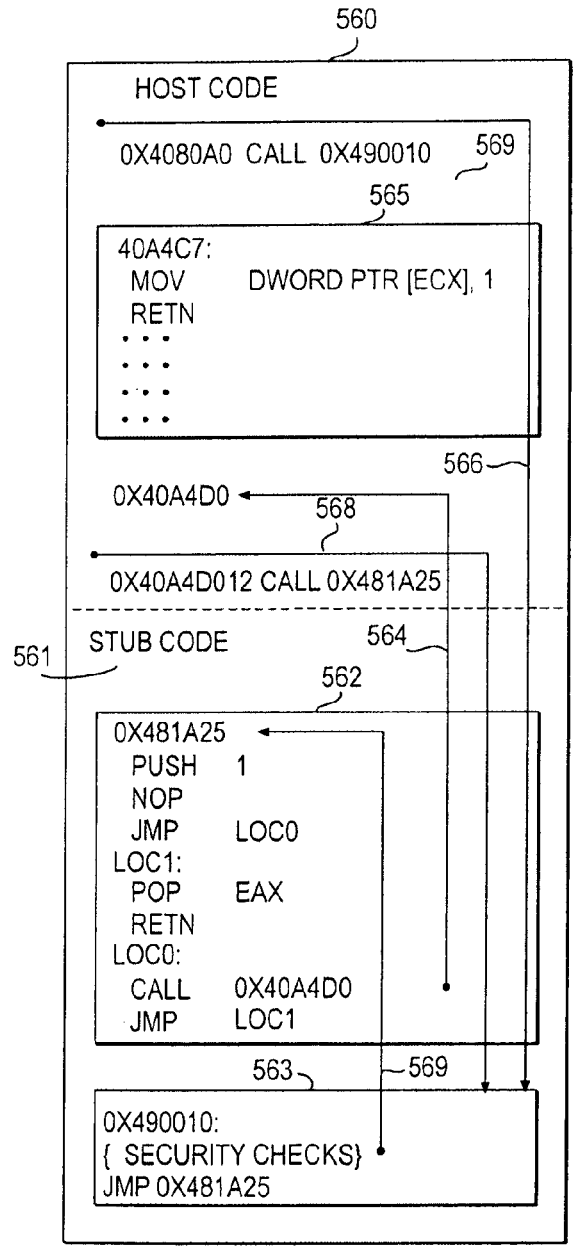

FIG. 5A illustrates an example of one host executable 550 in which a host block 552 has been identified at offset 0x40A4C7. Block 552 of the host code contains one outbound reference 554 (a call to location 0x40A4D0) and two inbound references 556 and 558 (at locations 0x4080A0 and 0x40D012, respectively). FIG. 5B shows the final executable 560 produced as a result of various embodiments. In executable 560, host block 552 has been moved to the stub code section 561 at location 562 and outbound references have been corrected accordingly. In particular, outbound reference 554 has been re-routed as outbound reference 564. The inbound references 556 and 558 to host block 552 have been re-routed to a stub routine 563 contained within the stub code section 561 and located at offset 0x490010 as shown in FIG. 5B as location 563. The host code block at location 565 (same location as block 552) has been overwritten with random instructions. As described above, stub routine 563 can be any of a variety of security, authorization, verification, digital rights management, access control, and/or tamper-proofing routines that can be executed prior to or after enabling access to the host code. Inbound reference 556 has been re-routed to stub routine 563 as inbound reference 566. Inbound reference 558 has been re-routed to stub routine 563 as inbound reference 568. When stub routine 563 has completed execution, processing control is transferred back from stub routine 563 to the copy of host block 562 at location 0x481A25 on path 569. At this point, the stub code section 561 has completed a desired level of security and/or access checking by virtue of the execution of stub routine 563. As an additional defense against potential hackers, the copy of host block 552 has been code transformed (e.g. obfuscated) using conventional techniques and the transformed code has been moved to the stub code section 561 at location 562. The outbound references have been corrected accordingly. As described above, the inbound references have been re-directed to the stub-routine 563 contained within the stub code section 561. The transformed host block 562 is difficult for potential attackers to find and detach or disable from the host code.

Figure 9:
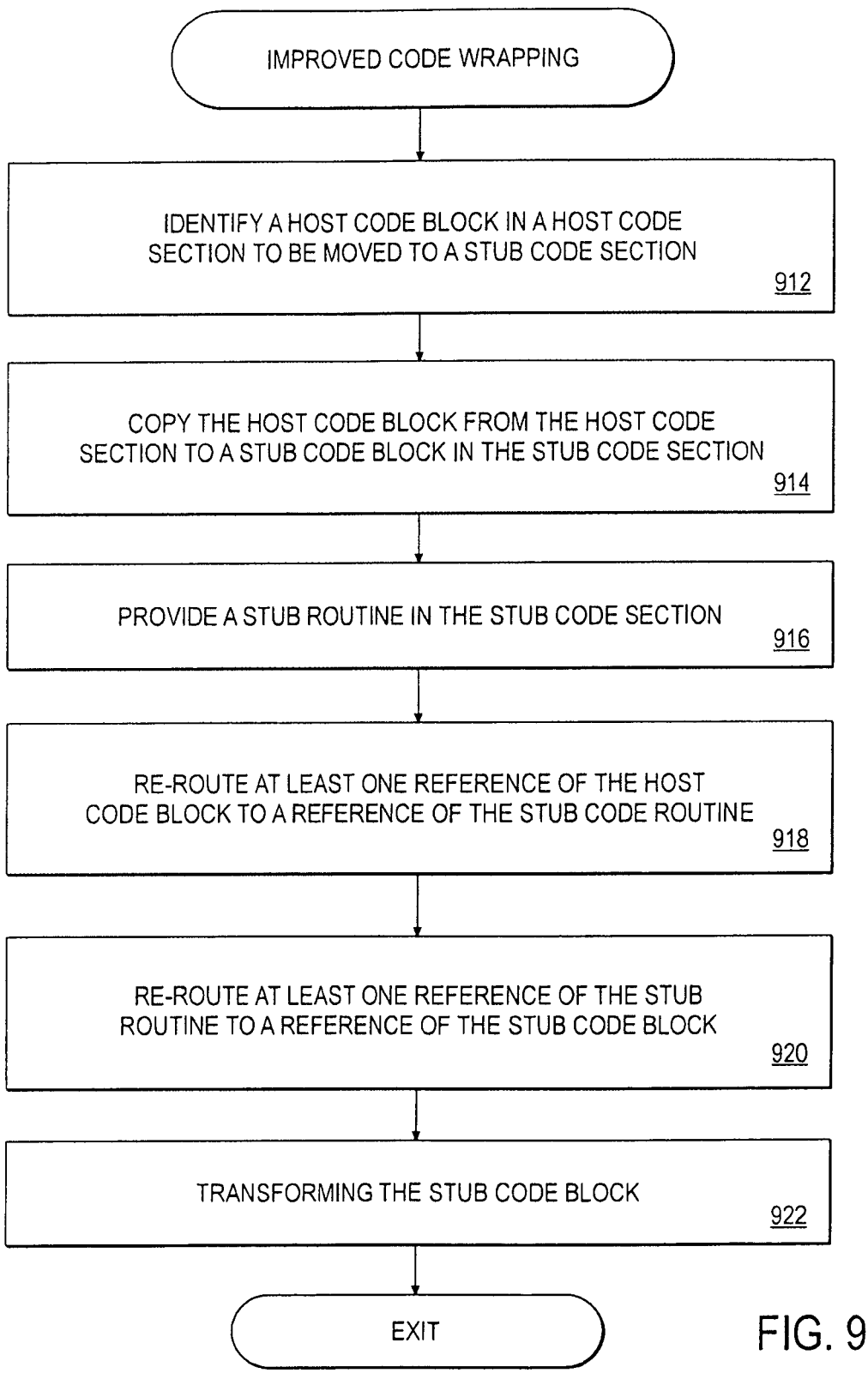

Referring to FIG. 9, a flow diagram illustrates the processing steps performed in one embodiment. At processing block 912, a host code block in the host code section is identified. At processing block 914, a copy of the host code block is written to a stub code block in the stub code section. At processing block 916, a stub routine is provided in the stub code section. As described above, the stub routine can be any of the security, authorization, verification, digital rights management, access control, and/or tamper-proofing routines described above. At processing block 918, at least one reference of the host code block is re-routed to be a reference of the stub routine. At processing block 920, at least one reference of the stub routine is re-routed to be a reference of the stub code block. In various embodiments, outbound and inbound references are corrected in the manner described above. At processing block 922, the stub code block is transformed (e.g. obfuscated).

Performing security checks, such as those executed by stub routine 563, can take a few milliseconds to be executed. In another embodiment, host functions are divided into two categories: 1) functions that are not performance sensitive and thus may contain security checks, and 2) functions that are performance sensitive and thus should not contain security checks. There are multiple methods of categorizing the host functions.

In one embodiment, performance-sensitive functions can be identified by having a pre-defined list of known performance-sensitive functions that a disassembler can readily identify. Run-time functions such as fclose, malloc, etc. that are statically linked to the host executable (and thus form the host executable) can be detected by commercial tools such as IDA Pro FLIRT.

In another embodiment, performance-sensitive functions can be identified by profiling the host executable and collecting information about function execution.

In another embodiment, performance-sensitive functions can be determined interactively prompting the user at wrapping time.

In many circumstances, it is advisable to decouple the security checks from their response in case the checks fail. Decoupling the security checks from their response makes it more difficult for attackers to disable the security checks or the responses In another embodiment, the improved wrapping process consists of identifying blocks within the host code that can be moved across the boundary between the executable code and the wrapper. This process involves copying the host block to the memory section of the stub, adjusting outbound memory references from the host block to other blocks or locations within the host, and pointing the inbound blocks to a stub routine that performs security responses based on previously executed security checks. Such security responses may include showing messages to the end-user, shutting down the application, modifying registers or function return values, or any action that modifies the expected application behavior.

The embodiments described above can be used in conjunction with a digital signature that verifies the integrity of the executable as described in U.S. Pat. No. 6,802,006. It is also possible and advisable to combine elements from the various described embodiments to create more effective protection of the host executable.

Figure 10A:
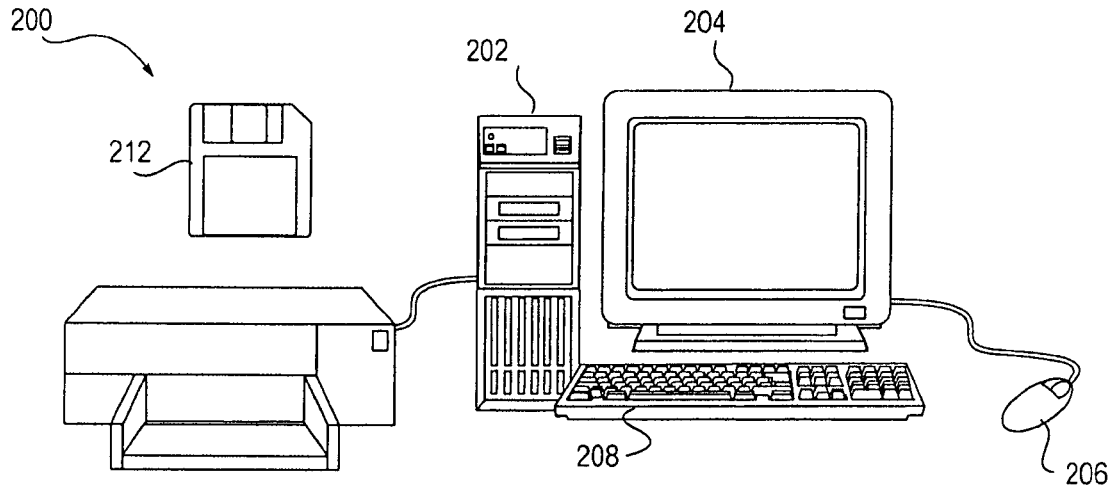
FIGS. 10a and 10b are block diagrams of a computing system on which an embodiment may operate and in which embodiments may reside.
Figure 10B:
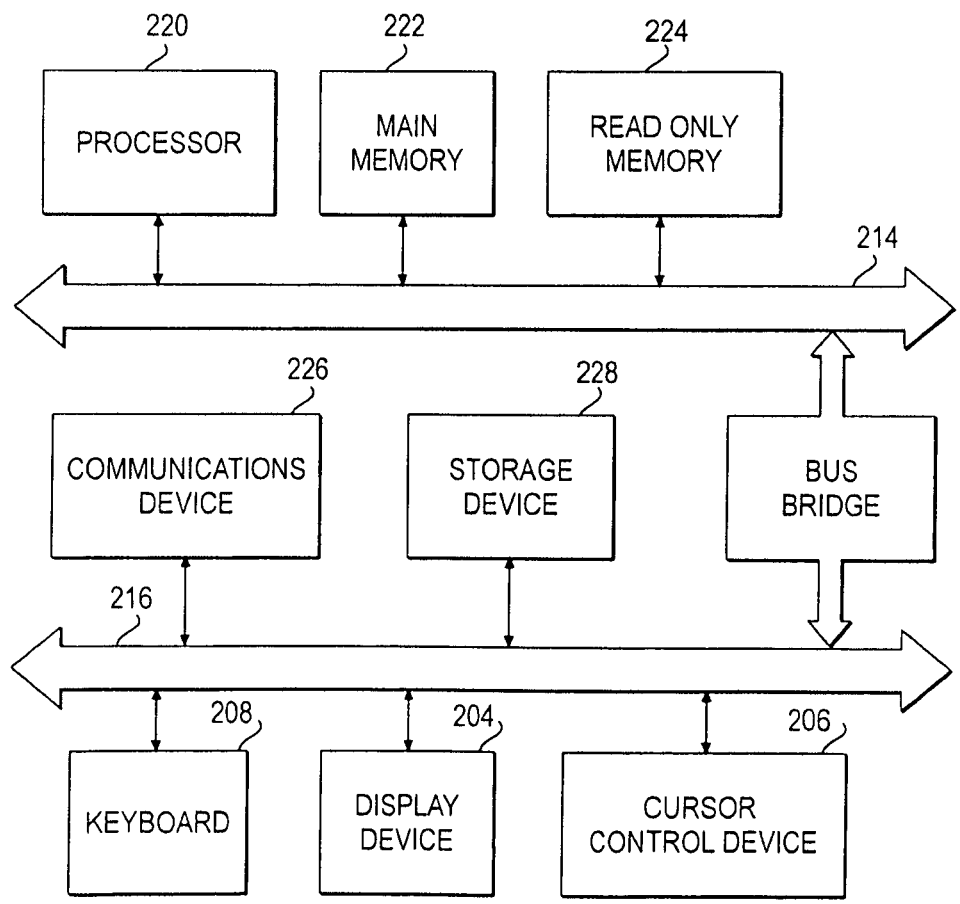

FIGS. 10a and 10b show an example of a computer system 200 illustrating an exemplary client or server computer system in which the features of an example embodiment may be implemented. Computer system 200 is comprised of a bus or other communications means 214 and 216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

A communication device 226 may also be coupled to bus 216 for accessing remote computers or servers, such as a web server, or other servers via the Internet, for example. The communication device 226 may include a modem, a network interface card, or other well-known interface devices, such as those used for interfacing with Ethernet, Token-ring, wireless, or other types of networks. In any event, in this manner, the computer system 200 may be coupled to a number of servers via a conventional network infrastructure.

The system of an example embodiment includes software, information processing hardware, and various processing steps, as described above. The features and process steps of example embodiments may be embodied in machine or computer executable instructions. The instructions can be used to cause a general purpose or special purpose processor, which is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

It should be noted that the methods described herein do not have to be executed in the order described, or in any particular order. Moreover, various activities described with respect to the methods identified herein can be executed in repetitive, simultaneous, recursive, serial, or parallel fashion. Information, including parameters, commands, operands, and other data, can be sent and received in the form of one or more carrier waves through communication device 226.

Upon reading and comprehending the content of this disclosure, one of ordinary skill in the art will understand the manner in which a software program can be launched from a computer-readable medium in a computer-based system to execute the functions defined in the software program described above. One of ordinary skill in the art will further understand the various programming languages that may be employed to create one or more software programs designed to implement and perform the methods disclosed herein. The programs may be structured in an object-orientated format using an object-oriented language such as Java, Smalltalk, or C++. Alternatively, the programs can be structured in a procedure-orientated format using a procedural language, such as assembly or C. The software components may communicate using any of a number of mechanisms well known to those of ordinary skill in the art, such as application program interfaces or inter-process communication techniques, including remote procedure calls. The teachings of various embodiments are not limited to any particular programming language or environment, including HTML and XML.

Thus, other embodiments may be realized. For example, FIGS. 10a and 10b illustrate block diagrams of an article of manufacture according to various embodiments, such as a computer 200, a memory system 222, 224, and 228, a magnetic or optical disk 212, some other storage device 228, and/or any type of electronic device or system. The article 200 may include a computer 202 (having one or more processors) coupled to a computer-readable medium 212, and/or a storage device 228 (e.g., fixed and/or removable storage media, including tangible memory having electrical, optical, or electromagnetic conductors) or a carrier wave through communication device 226, having associated information (e.g., computer program instructions and/or data), which when executed by the computer 202, causes the computer 202 to perform the methods described herein.

Various embodiments are described. In particular, the use of embodiments with various types and formats of user interface presentations may be described. It will be apparent to those of ordinary skill in the art that alternative embodiments of the implementations described herein can be employed and still fall within the scope of the claims set forth below. In the detail herein, various embodiments are described as implemented in computer-implemented processing logic denoted sometimes herein as the "Software". As described above, however, the claimed invention is not limited to a purely software implementation.

Thus, a computer-implemented method and system for binding digital rights management executable code to a software application are disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

What is claimed is:
1. A computer-implemented method, comprising:
executing a host code section;
identifying, during execution of the host code section, a host code block in the host code section;
categorizing, during execution of the host code section, the host code block by a function, wherein the function is performance sensitive or not performance sensitive; and upon categorizing the host code block by the function as being not performance sensitive, processing the host code block, wherein processing the host code block includes:

copying, during execution of the host code section, the host code block from the host code section to a stub code block in a stub code section;

copying, during execution of the host code section, the stub code block to the host code block in the host code section;

re-routing at least one reference of the host code block to be a reference of the stub code block prior to termination of execution of the host code section; and re-routing at least one reference of the stub code block to be a reference of the host code block prior to termination of execution of the host code section.

2. The computer-implemented method as claimed in claim 1 wherein the at least one reference of the host code block is an outbound reference.

3. The computer-implemented method as claimed in claim 1 wherein the at least one reference of the host code block is an inbound reference.

4. The computer-implemented method as claimed in claim 1 wherein the host code block in the host code section is rendered inoperable.

5. The computer-implemented method as claimed in claim 1 wherein the host code block in the host code section is identified by disassembling the host code section.

6. The computer-implemented method as claimed in claim 1 wherein the host code block in the host code section is identified by comparing host code blocks against a predefined list of functions.

7. The computer-implemented method as claimed in claim 1 wherein the host code block in the host code section is identified interactively during a wrapping process.

8. The computer-implemented method as claimed in claim 1 further including retaining at least one reference of the host code block to remain a reference of the host code block.

9. The computer-implemented method as claimed in claim 8 wherein the host code block in the host code section remains operable.

10. The computer-implemented method as claimed in claim 1 further comprising:

providing a stub routine in the stub code section;

re-routing at least one reference of the host code block to be a reference of the stub routine; and re-routing at least one reference of the stub routine to be a reference of the stub code block.

11. The computer-implemented method as claimed in claim 10 wherein the at least one reference of the host code block is an outbound reference.

12. The computer-implemented method as claimed in claim 10 wherein the at least one reference of the host code block is an inbound reference.

13. The computer-implemented method as claimed in claim 10 wherein the stub routine is a digital rights management routine.

14. The computer-implemented method as claimed in claim 10 wherein the stub routine is an optical disc verification routine.

15. The computer-implemented method as claimed in claim 10 wherein the stub routine is an authentication verification routine.

16. The computer-implemented method as claimed in claim 10 wherein the stub routine is a tamper-proofing verification routine.

17. The computer-implemented method as claimed in claim 10 further including transforming the stub code block.

18. An article of manufacture embodied as a non-transitory computer-readable medium storing data that, when accessed by a machine, causes the machine to perform operations comprising:

executing a host code section;

identifying, during execution of the host code section, a host code block in the host code section;

categorizing, during execution of the host code section, the host code block by a function, wherein the function is performance sensitive or not performance sensitive; and upon categorizing the host code block by the function as being not performance sensitive, processing the host code block, wherein processing the host code block includes:

copying, during execution of the host code section, the host code block from the host code section to a stub code block in a stub code section;

copying, during execution of the host code section, the stub code block to the host code block in the host code section;

re-routing at least one reference of the host code block to be a reference of the stub code block prior to termination of execution of the host code section; and re-routing at least one reference of the stub code block to be a reference of the host code block prior to termination of execution of the host code section.

19. The article of manufacture as claimed in claim 18 wherein the at least one reference of the host code block is an outbound reference.

20. The article of manufacture as claimed in claim 18 wherein the at least one reference of the host code block is an inbound reference.

* * * * *